United States Patent
Min et al.

(10) Patent No.: US 8,160,490 B2
(45) Date of Patent: Apr. 17, 2012

(54) APPARATUS AND METHOD FOR CONTROLLING POWER IN WIRELESS COMMUNICATION SYSTEM USING RELAYING

(75) Inventors: Chan-Ho Min, Yongin-si (KR); Jong-Hyung Kwun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 573 days.

(21) Appl. No.: 12/218,810

(22) Filed: Jul. 18, 2008

(65) Prior Publication Data

US 2009/0036050 A1   Feb. 5, 2009

(30) Foreign Application Priority Data

Jul. 24, 2007   (KR) ........................ 10-2007-0074012

(51) Int. Cl.
*H04B 3/36* (2006.01)

(52) U.S. Cl. ............ 455/7; 455/11.1; 455/13.4; 455/15; 455/18; 455/343.1; 370/315; 370/318

(58) Field of Classification Search ............. 455/7, 11.1, 455/13.4, 15, 18, 574, 343.1–343.5; 370/315, 370/318

See application file for complete search history.

(56) References Cited

U.S. PATENT DOCUMENTS

| | | | |
|---|---|---|---|
| 2005/0232183 A1* | 10/2005 | Sartori et al. | 370/319 |
| 2007/0133451 A1* | 6/2007 | Lee et al. | 370/318 |
| 2008/0045145 A1* | 2/2008 | Nakatsugawa | 455/11.1 |

FOREIGN PATENT DOCUMENTS

| | | | |
|---|---|---|---|
| KR | 1020060042128 A | | 5/2006 |
| KR | 1020060043533 A | | 5/2006 |
| KR | 100788899 B1 | | 12/2007 |
| WO | WO 03/017688 A2 | | 2/2003 |

* cited by examiner

*Primary Examiner* — Fayyaz Alam

(57) ABSTRACT

An apparatus and method for controlling a mode transition of a mobile station (MS) in a relay station (RS) in a wireless communication system are provided, in which upon receipt of a mode transition request signal from at least one MS within a service area of the RS, the RS determines whether to approve the mode transition request, sets management information for the mode transition of the MS, if the mode transition request of the MS is approved, and transmits the management information to the MS.

21 Claims, 10 Drawing Sheets

US 8,160,490 B2

APPARATUS AND METHOD FOR CONTROLLING POWER IN WIRELESS COMMUNICATION SYSTEM USING RELAYING

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jul. 24, 2007 and assigned Serial No. 2007-74012, the entire disclosure of which is hereby incorporated by reference.

TECHNICAL FIELD OF THE INVENTION

The present invention generally relates to a wireless communication system using relaying. More particularly, the present invention relates to an apparatus and method for reducing power consumption by controlling idle mode and sleep mode of a mobile station (MS) in a wireless communication system using relaying.

BACKGROUND OF THE INVENTION

Typically, a wireless communication system makes communications between a fixed base station (BS) and an MS via a single direct link, thus having low flexibility in configuring a wireless network. That is, it is difficult to configure a wireless network to provide services under a wireless environment experiencing fluctuating changes in traffic distribution or the number of required calls.

In this context, studies have been conducted on relaying data over multiple hops using relay stations (RSs) in the wireless communication system.

The relay service enables the wireless communication system to reconfigure a network fast according to a communication environment change and to efficiently operate the entire wireless network.

Also, the wireless communication system can provide a high-speed radio channel to an MS by establishing an RS between a BS and the MS. Therefore, the use of RSs provides a high-speed data channel to MSs in poor channel status at a cell boundary and expands cell coverage.

When communications are not in progress, an MS is placed in idle mode or sleep mode in order to reduce power consumption. As illustrated in FIG. 1, the idle mode or sleep mode of the MS is controlled by its serving BS. While the control is about the MS's operation in the sleep mode in the illustrated case of FIG. 1, it is a mere exemplary application. Hence, the same thing applies to the MS's operation in the idle mode.

FIG. 1 is a diagram illustrating a signal flow for a sleep-mode operation in a conventional wireless communication system.

Referring to FIG. 1, an MS 101 transmits a sleep request message requesting transition to the sleep mode to a BS 105 through an RS 103 in steps 111 and 113.

Upon receipt of the sleep request message, the BS 105 determines whether to approve the sleep mode transition. If it approves the sleep mode transition, the BS 105 determines management information required for the MS 101 to operate in the sleep mode. Then the BS 105 transmits a sleep response message including the management information to the MS 101 through the RS 103 in steps 115 and 117. The management information specifies a sleep mode transition time, an initial sleep duration, a maximum sleep duration, a listening duration, and a sleep duration extension rate.

The BS 105 checks when the MS 101 is supposed to enter the sleep mode based on the sleep mode management information. When the MS 101 transitions to the sleep mode, the BS 105 transmits a traffic indication message to the MS 101 through the RS 103, taking into account the listening duration information of the MS 101 in steps 123 and 125. The traffic indication message includes the presence or absence of data to be transmitted to the MS 101.

Upon receipt of the sleep response message, the MS 101 determines whether the BS 105 has approved the sleep mode transition. If the BS 105 has approved, the MS 101 sleeps during the initial sleep duration from the sleep mode transition time based on the sleep mode management information in step 119.

Then the MS 101 transitions to listening mode according to the listening duration information and monitors reception of the traffic indication message from the RS 103 in step 121. Upon receipt of the traffic indication message, the MS 101 determines whether data for the MS 101 exists from the traffic indication message.

As described above, when it does not communicate, the MS operates in the idle mode or sleep mode under the control of the BS in order to save power. During the idle-mode operation or the sleep-mode operation, the MS receives a downlink signal only during a listening period. Therefore, the BS transmits a paging signal or a traffic indication message to the MS based on the listening duration information of the MS, to thereby notify the presence or absence of data for the MS.

When a relay service is provided, the BS transmits a signal to the MS via the RS. The resulting processing delay of the RS may make the transmission timing of the BS asynchronous to the reception timing of the MS. That is, the MS may not receive the paging signal or the traffic indication message that the BS transmits according to the listening duration information of the MS, due to the processing delay of the RS.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an apparatus and method for reducing power consumption of an MS in a wireless communication system using relaying.

Another aspect of exemplary embodiments of the present invention provides an apparatus and method for reducing power consumption of an MS under the control of an RS in a wireless communication system using relaying.

A further aspect of exemplary embodiments of the present invention provides an apparatus and method for reducing power consumption of an MS by controlling an idle-mode operation of the MS by an RS in a wireless communication system using relaying.

Still another aspect of exemplary embodiments of the present invention provides an apparatus and method for reducing power consumption of an MS by controlling a sleep-mode operation of the MS by an RS in a wireless communication system using relaying.

In accordance with an aspect of exemplary embodiments of the present invention, there is provided a method for controlling a mode transition of an MS in an RS in a wireless communication system, in which upon receipt of a mode transition request signal from at least one MS within a service area of the RS, the RS determines whether to approve the mode transition request, sets management information for the mode transition of the MS, if the mode transition request of the MS is approved, and transmits the management information to the MS.

In accordance with another aspect of exemplary embodiments of the present invention, there is provided a method for controlling a mode transition of an MS in a BS in a wireless communication system, in which the BS checks management information for a mode transition of an MS and information about a processing delay of at least one lower RS in a signal received from an RS, and transmits a signal indicating whether there is data to be transmitted to the MS to the RS, taking into account the processing delay of the lower RS.

In accordance with a further aspect of exemplary embodiments of the present invention, there is provided an apparatus of an RS in a wireless communication system, in which a receiver receives a mode transition request signal from at least one MS within a service area of the RS, a controller determines whether to approve the mode transition request, upon receipt of the mode transition request signal, and sets management information for the mode transition of the MS, if the mode transition request of the MS is approved, and a transmitter transmits the management information to the MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for controlling idle mode and sleep mode of an MS to reduce the power consumption of the MS in a wireless communication system using relaying.

While the following description is made in the context of a time division duplex-orthogonal frequency division multiple access (TDD-OFDMA) wireless communication system, it is to be understood that the present invention is also applicable to communication systems using other communication schemes.

In the wireless communication system, an RS controls MSs that are not in communications to transition to idle mode or sleep mode in order to save power for them. Herein, it is assumed that frames from a BS and an RS are synchronized and have the same frame number.

A description will first be made of a method for transitioning an MS to sleep mode under the control of an RS in the wireless communication system.

Figure 1:
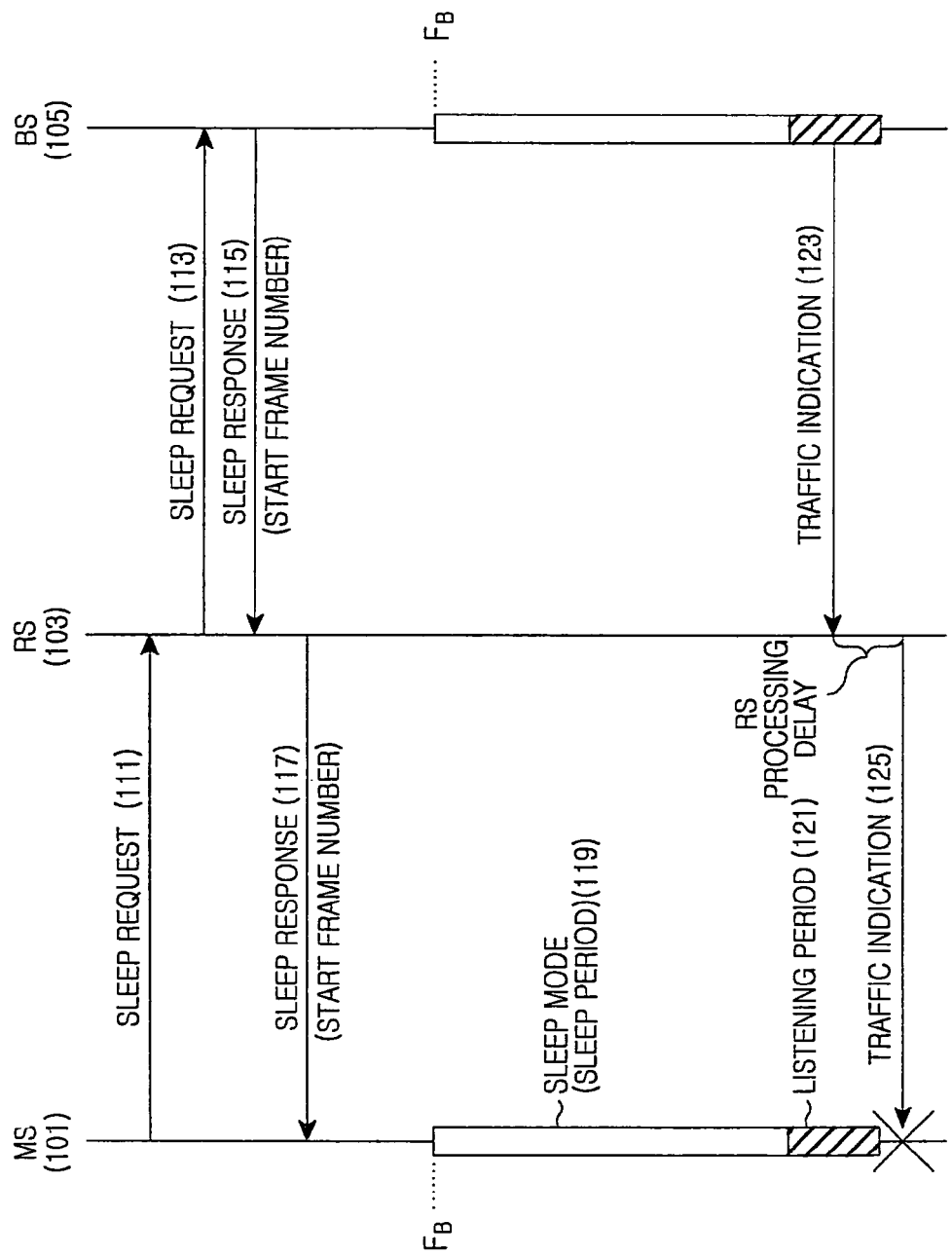
FIG. 1 is a diagram illustrating a signal flow for a sleep-mode operation in a conventional wireless communication system.
Figure 2:
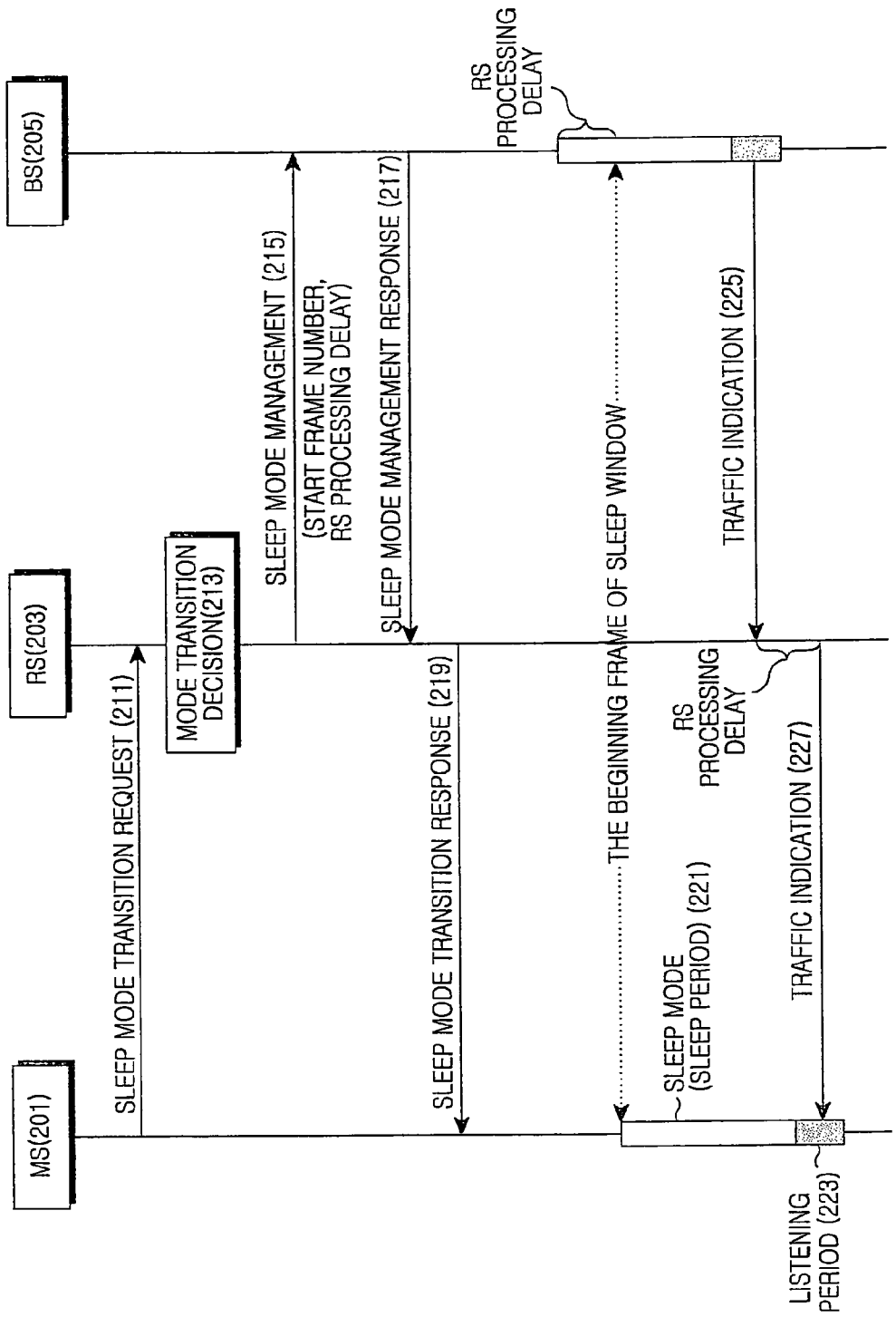
FIG. 2 is a diagram illustrating a signal flow for a sleep-mode operation in a wireless communication system using relaying according to an exemplary embodiment of the present invention.

FIG. 2 is a diagram illustrating a signal flow for a sleep-mode operation in a wireless communication system using relaying according to an exemplary embodiment of the present invention.

Referring to FIG. 2, the wireless communication system includes an MS 201, an RS 203, and a BS 205.

If the MS 201 is not in communications, it transmits a sleep mode transition request message to the RS 203 to save power in step 211. The sleep mode transition request message includes sleep mode management information determined by the MS 201. For example, the sleep mode transition information specifies a sleep mode transition time, an initial sleep duration, a maximum sleep duration, a listening duration, and a sleep duration extension rate.

Upon receipt of the sleep mode transition request message, the RS 203 determines whether to approve the sleep mode transition in step 213. If it approves the sleep mode transition, the RS 203 determines management information required for the MS 201 to operate in the sleep mode.

Then the RS 203 transmits a sleep mode management message including the RS-determined sleep mode management information and its processing delay information to the BS 205 in step 215.

When receiving the sleep mode management message successfully, the BS 205 transmits a sleep mode management response message, for example, an acknowledgment (ACK) message for the sleep mode management message to the RS 203 in step 217.

While not shown, if the received sleep mode management message has errors, the BS 205 requests retransmission of the sleep mode management message to the RS 203 by transmitting a negative ACK (NACK) message.

Upon receipt of the sleep mode management response message, the RS 203 transmits a sleep mode transition response message including the RS-determined sleep mode management information of step 213 to the MS 201 in step 219.

Upon receipt of the sleep mode transition response message, the MS 201 determines whether the RS 203 has approved the sleep mode transition. If the RS 203 has approved, the MS 201 transitions to the sleep mode based on the sleep mode management information set in the sleep mode transition response message. That is, the MS 201 sleeps for the initial sleep duration from the sleep mode transition time in step 221.

Then the MS 201 transitions to listening mode according to the listening duration information and monitors reception of the traffic indication message from the RS 203 in step 223. Upon receipt of the traffic indication message, the MS 201 determines whether data for the MS 201 exists from the traffic indication message.

The BS 205 can get knowledge of the sleep mode transition time, the sleep duration, the listening duration, and the processing delay of the RS 203 from the RS-determined sleep mode management information received from the RS 203. Therefore, the BS 205 transmits the traffic indication message to the MS 201, taking into account the processing delay of the RS 203 so that the MS 201 can receive the traffic indication message in steps 225 and 227. That is, the BS 205 transmits the traffic indication message to the sleep-mode MS 201 earlier than a listening mode transition time by as much time as the processing delay of the RS 203.

In the above exemplary embodiment of the present invention, a serving RS controls sleep-mode transition of an MS in a two-hop relay wireless communication system. In a three or more-hop relay wireless communication system, the serving RS controls sleep-mode transition of an MS that is not in communications, as illustrated in FIG. 3.

Figure 3:
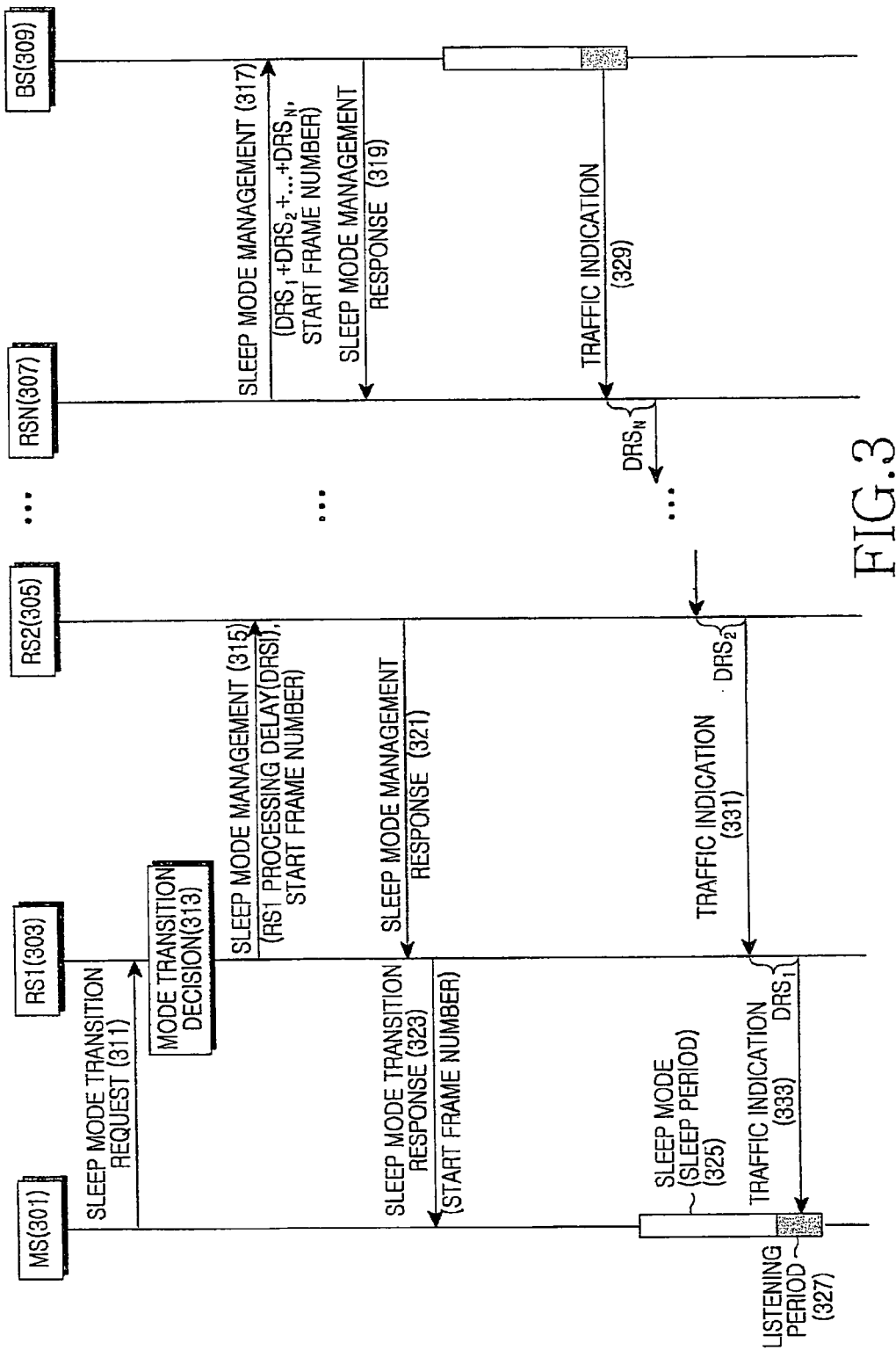
FIG. 3 is a diagram illustrating a signal flow for a sleep-mode operation in a multi-hop relay wireless communication system according to an exemplary embodiment of the present invention.

FIG. 3 is a diagram illustrating a signal flow for a sleep-mode operation in a multi-hop relay wireless communication system according to an exemplary embodiment of the present invention.

Referring to FIG. 3, the wireless communication system includes an MS 301, a plurality of RSs 303, 305 and 307 (RS1, RS2, and RSN), and a BS 309.

If the MS 301 is not in communications, it transmits a sleep mode transition request message to RS1 to save power in step 311. The sleep mode transition request message includes sleep mode management information determined by the MS 301. For example, the sleep mode transition information specifies a sleep mode transition time, an initial sleep duration, a maximum sleep duration, a listening duration, and a sleep duration extension rate.

Upon receipt of the sleep mode transition request message, RS1 determines whether to approve the sleep mode transition in step 313. If it approves the sleep mode transition, RS1 determines management information required for the MS 301 to operate in the sleep mode.

Then RS1 transmits a sleep mode management message including the RS-determined sleep mode management information and its processing delay information ($DRS_1$) to the BS 309 through the upper RSs 305 and 307 in step 315 and 317. RSs (RS2~RSN-1) transmit sleep mode management messages including the processing delays of their lower RSs and their processing delays ($DRS_2$, $DRS_{N-1}$) to the upper RS. RSN transmit sleep mode management messages including the processing delays of their lower RSs and their processing delays ($DRS_N$) to the BS 309. For example, RS2 adds its processing time ($DRS_2$) to the sleep mode management message received from RS1 and transmits the resulting sleep mode management message to its upper RS (RS3).

When receiving the sleep mode management message successfully, the BS 309 transmits a sleep mode management response message, for example, an ACK message for the sleep mode management message to RS1 through RS2 and RSN in step 319 and 321.

While not shown, if the received sleep mode management message has errors, the BS 309 requests retransmission of the sleep mode management message by transmitting a NACK message to its lower RSs 303, 305 and 307.

Upon receipt of the sleep mode management response message, RS1 transmits a sleep mode transition response message including the RS-determined sleep mode management information of step 313 to the MS 301 in step 323.

Upon receipt of the sleep mode transition response message, the MS 301 determines whether RS1 has approved the sleep mode transition. If RS1 has approved, the MS 301 transitions to the sleep mode based on the sleep mode management information set in the sleep mode transition response message. That is, the MS 301 sleeps for the initial sleep duration from the sleep mode transition time in step 325.

Then the MS 301 transitions to listening mode according to the listening duration information and monitors reception of the traffic indication message from RS1 in step 327. Upon receipt of the traffic indication message, the MS 301 determines whether data for the MS 201 exists from the traffic indication message.

The BS 309 can get knowledge of the sleep mode transition time, the sleep duration, the listening duration, and the processing delays ($DRS_1$, $DRS_2$, $DRS_N$) of the RSs 303, 305 and 307 from the RS-determined sleep mode management information received from RS1, RS2 and RSN. Therefore, the BS 309 transmits the traffic indication message to the MS 301, taking into account the processing delays of RS1, RS2 and RSN so that the MS 301 can receive the traffic indication message through RS1, RS2 and RSN in steps 329, 331 and 333. That is, the BS 309 transmits the traffic indication message to the sleep-mode MS 301 earlier than a listening mode transition time by as much time as the processing delays of RS1, RS2 and RSN ($DRS_1$, $DRS_2$, $DRS_N$).

As described above, a serving RS controls sleep-mode transition of an MS that is not in communications in order to save power for the MS in the wireless communication system. The serving RS operates in the manner described in FIG. 4.

Figure 4:
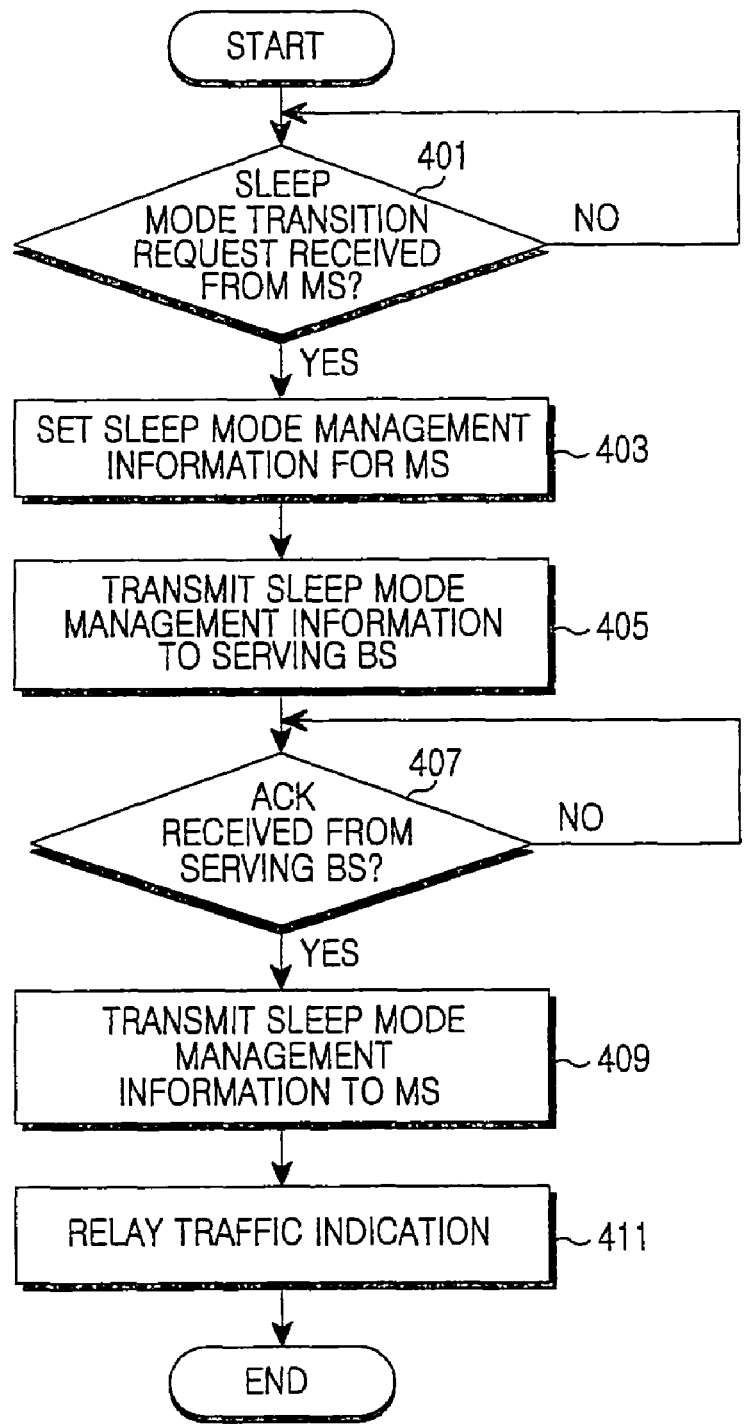
FIG. 4 is a flowchart illustrating an operation of an RS for controlling a sleep-mode operation of an MS in the wireless communication system using relaying according to an exemplary embodiment of the present invention.

FIG. 4 is a flowchart illustrating an operation of an RS for controlling a sleep-mode operation of an MS in the wireless communication system using relaying according to an exemplary embodiment of the present invention.

Referring to FIG. 4, the RS monitors reception of a sleep mode transition request message from an MS within its service area in step 401.

Upon receipt of the sleep mode transition request message, the RS sets sleep mode management information for the MS in step 403. For example, the RS determines whether to approve the sleep mode transition of the MS. If approving the sleep mode transition of the MS, the RS checks sleep mode management information set by the MS in the sleep mode transition request message and determines the sleep mode management information based on the MS-determined sleep mode management information. The sleep mode management information specifies a sleep mode transition time, an initial sleep duration, a maximum sleep duration, a listening duration, and a sleep duration extension rate.

Then the RS transmits the RS-determined sleep mode management information and its processing delay information to a serving BS, for example, by a sleep mode management message in step 405.

In step 407, the RS monitors reception of a response message (i.e., an ACK message for the sleep mode management message) from the serving BS. While not shown, upon receipt of a NACK message, the RS retransmits the sleep mode management message to the serving BS, considering that the transmitted sleep mode management message has errors.

Upon receipt of an ACK message, the RS transmits the RS-determined sleep mode management information to the MS, for example, by a sleep mode transition response message in step 409.

In step 411, the RS relays a traffic indication message received from the serving BS to the MS.

Then the RS ends the algorithm.

Figure 5:
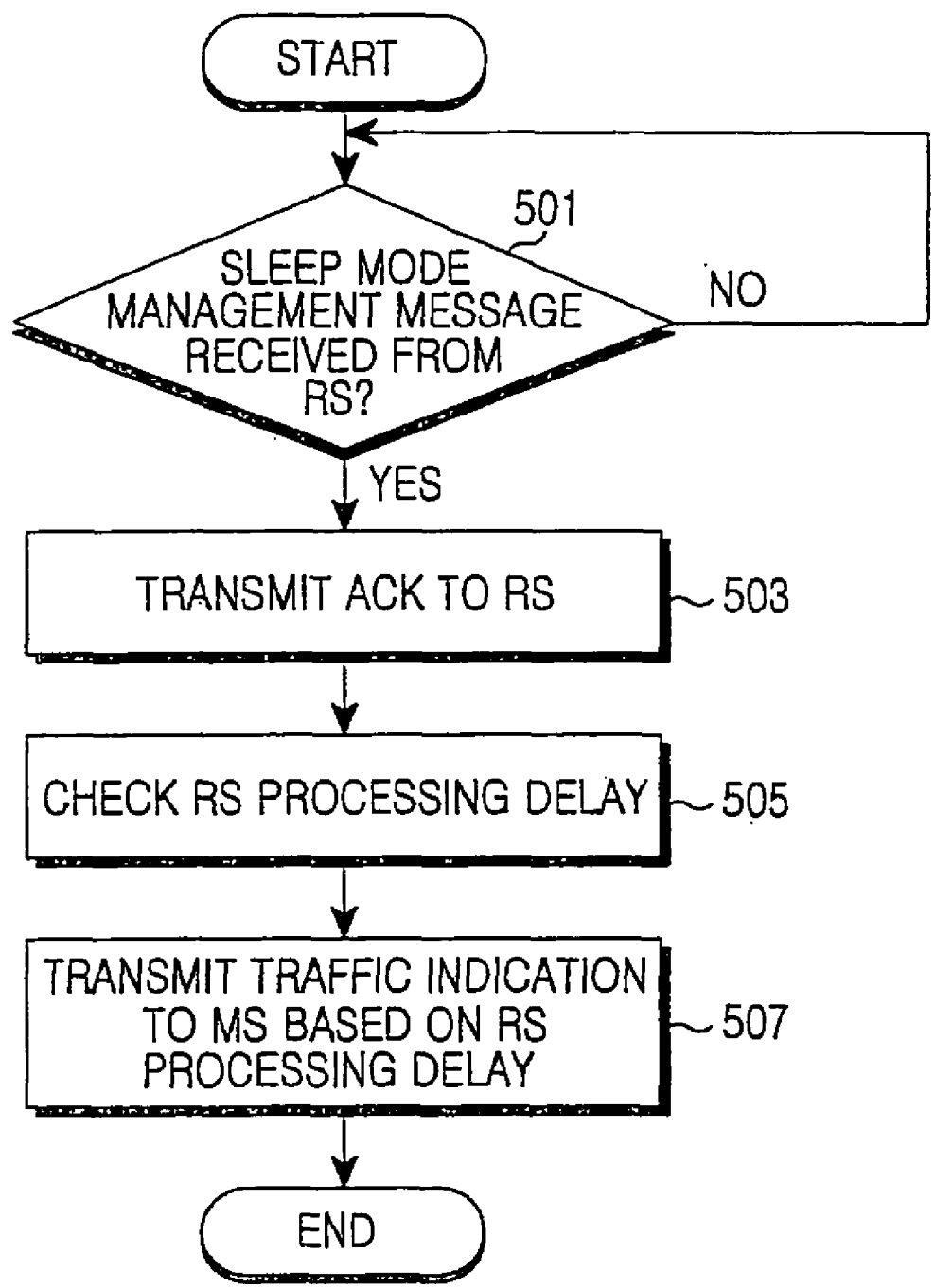
FIG. 5 is a flowchart illustrating an operation of a BS for controlling a sleep-mode operation of an MS in the wireless communication system using relaying according to an exemplary embodiment of the present invention.

When the RS controls the sleep mode transition of the MS as described above, the serving BS operates in the manner illustrated in FIG. 5.

FIG. 5 is a flowchart illustrating an operation of a BS for controlling a sleep-mode operation of an MS in the wireless communication system using relaying according to an exemplary embodiment of the present invention.

Referring to FIG. 5, the BS monitors reception of a sleep mode management message from the RS in step 501.

When receiving the sleep mode management message successfully, the BS transmits an ACK message for the sleep mode management message to the RS in step 503. While not shown, if the sleep mode management message has errors, the BS transmits a NACK message to the RS.

In step 505, the BS checks sleep mode management information about an MS that is to transition to sleep mode and a processing delay of the RS from the sleep mode management message. If the wireless communication system spans three or more hops, the BS checks all processing delays of a plurality of RSs that relay signals to the MS. For example, the sleep mode management information includes a sleep mode transition time of the MS, an initial sleep duration, a maximum sleep duration, a listening duration, and a sleep duration extension rate.

The BS transmits a traffic indication message to the RS, taking into account the process delay of the RS so that the sleep-mode MS can receive the traffic indication message during a listening period in step 507. For example, the BS transmits the traffic indication message earlier than a listening mode transition time of the MS by the process delay of the RS.

Then the BS ends the algorithm.

Now a description will be made of a method for transitioning an MS to idle mode under the control of an RS in the wireless communication system.

Figure 6:
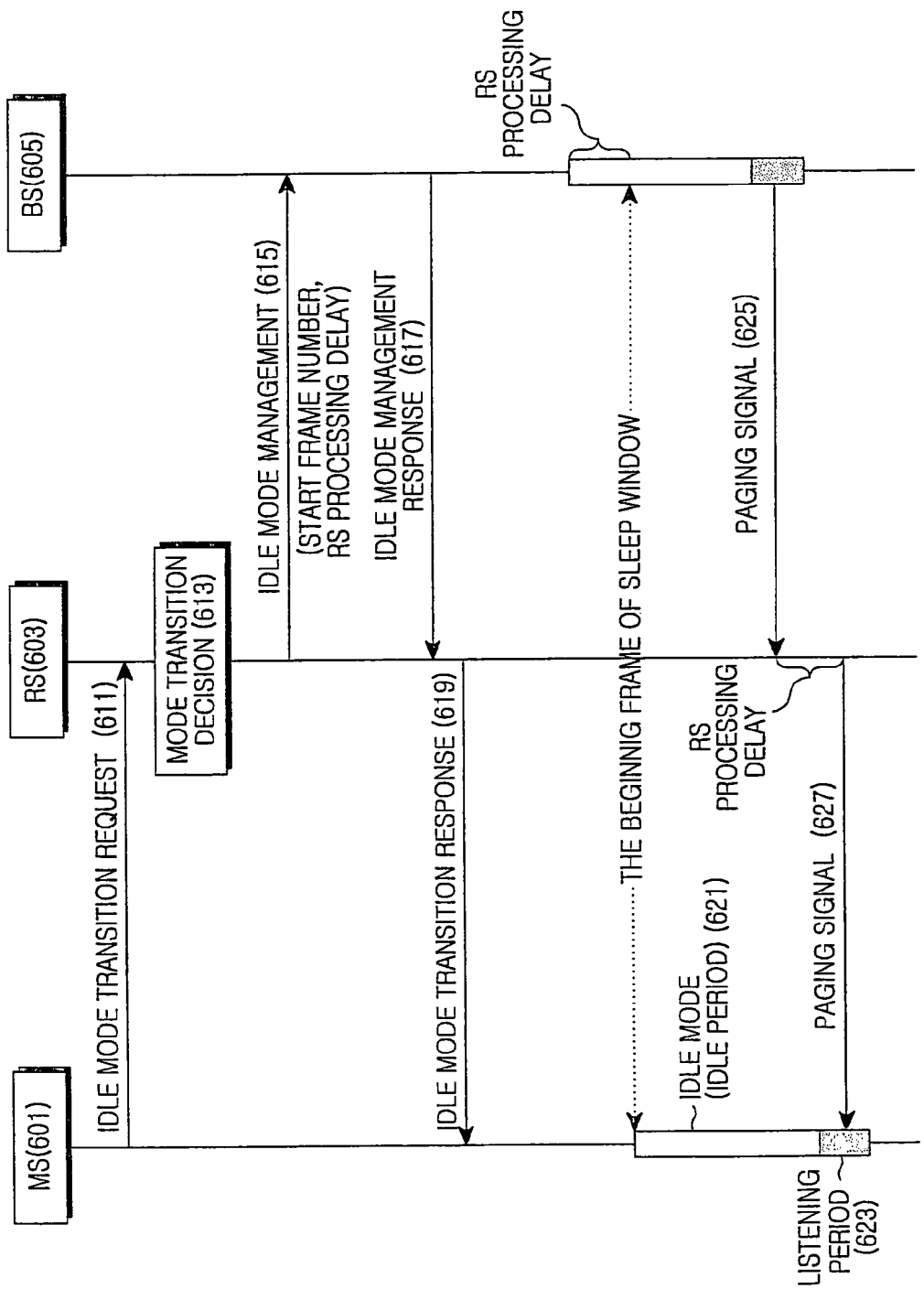
FIG. 6 is a diagram illustrating a signal flow for an idle-mode operation in the wireless communication system using relaying according to an exemplary embodiment of the present invention.

FIG. 6 is a diagram illustrating a signal flow for an idle-mode operation in the wireless communication system using relaying according to an exemplary embodiment of the present invention.

Referring to FIG. 6, the wireless communication system includes an MS 601, an RS 603, and a BS 605.

If the MS 601 is not in communications, it transmits an idle mode transition request message to the RS 603 to save power in step 611. The idle mode transition request message includes idle mode management information determined by the MS 601. For example, the idle mode transition information specifies an idle mode transition time, an initial idle duration, a maximum idle duration, a listening duration, and an idle duration extension rate.

Upon receipt of the idle mode transition request message, the RS 603 determines whether to approve the idle mode transition in step 613. If it approves the idle mode transition, the RS 603 determines idle mode management information required for the MS 601 to operate in the idle mode.

Then the RS 603 transmits an idle mode management message including the RS-determined idle mode management information and its processing delay information to the BS 605 in step 615.

When receiving the idle mode management message successfully, the BS 605 transmits an idle mode management response message, for example, an ACK message for the idle mode management message to the RS 603 in step 617.

While not shown, if the received idle mode management message has errors, the BS 605 requests retransmission of the idle mode management message to the RS 603 by transmitting a NACK message.

Upon receipt of the idle mode management response message, the RS 603 transmits an idle mode transition response message including the RS-determined idle mode management information of step 613 to the MS 601 in step 619.

Upon receipt of the idle mode transition response message, the MS 601 determines whether the RS 603 has approved the idle mode transition. If the RS 603 has approved, the MS 601 transitions to the idle mode based on the idle mode management information set in the idle mode transition response message. That is, the MS 601 sleeps for the initial idle duration from the idle mode transition time in step 621.

Then the MS 601 transitions to listening mode according to the listening duration information and monitors reception of a paging signal from the RS 603 in step 623.

The BS 605 can get knowledge of the idle mode transition time, the idle duration, the listening duration, and the processing delay of the RS 603 from the RS-determined idle mode management information received from the RS 603. Therefore, the BS 605 transmits the paging signal to the MS 601, taking into account the processing delay of the RS 603 so that the MS 601 can receive the paging signal through the RS 603 in steps 625 and 627. That is, the BS 605 transmits the paging signal to the idle-mode MS 601 earlier than a listening mode transition time by as much time as the processing delay of the RS 603.

In the above exemplary embodiment of the present invention, a serving RS controls idle-mode transition of an MS in a two-hop relay wireless communication system. In a three or more-hop relay wireless communication system, the serving RS controls idle-mode transition of an MS that is not in communications, as illustrated in FIG. 7.

Figure 7:
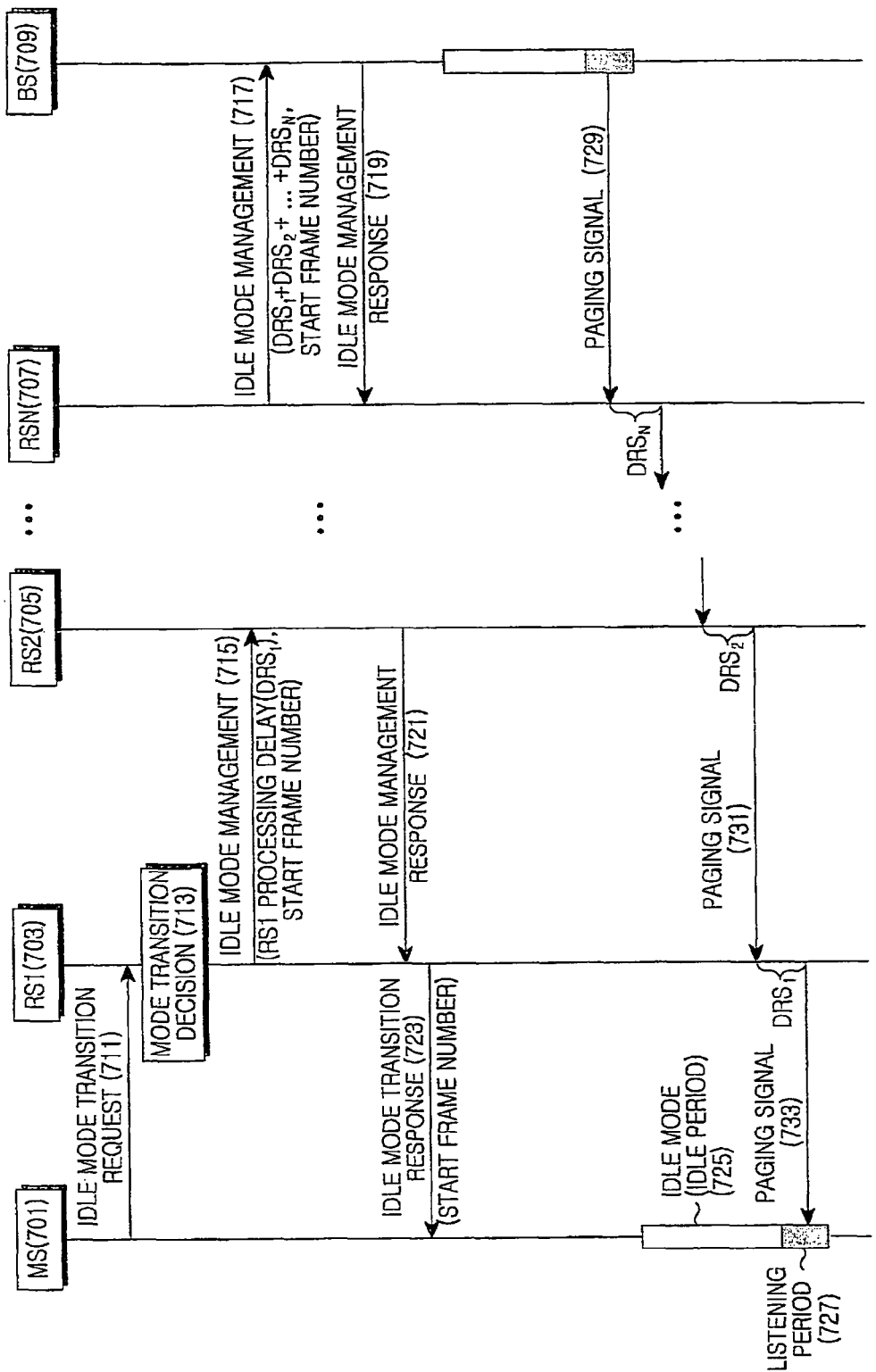
FIG. 7 is a diagram illustrating a signal flow for an idle-mode operation in the multi-hop relay wireless communication system according to an exemplary embodiment of the present invention.

FIG. 7 is a diagram illustrating a signal flow for an idle-mode operation in the multi-hop relay wireless communication system according to an exemplary embodiment of the present invention.

Referring to FIG. 7, the wireless communication system includes an MS 701, a plurality of RSs 703, 705 and 707 (RS1, RS2, and RSN), and a BS 709.

If the MS 701 is not in communications, it transmits an idle mode transition request message to RS1 to save power in step 711. The idle mode transition request message includes idle mode management information determined by the MS 701. For example, the idle mode transition information specifies an idle mode transition time, an initial idle duration, a maximum idle duration, a listening duration, and a idle duration extension rate.

Upon receipt of the idle mode transition request message, RS1 determines whether to approve the idle mode transition in step 713. If it approves the idle mode transition, RS1 determines management information required for the MS 701 to operate in the idle mode.

Then RS1 transmits an idle mode management message including the RS-determined idle mode management information and its processing delay information ($DRS_1$) to the BS 709 through the upper RSs 705 and 707 in step 715 and 717. RSs (RS2~RSN−1) transmit idle mode management messages including the processing delays of their lower RSs and their processing delays ($DRS_2$, $DRS_{N-1}$) to their upper RSs. RSN transmits idle mode management messages including the processing delays of their lower RSs and their processing delays ($DRS_N$) to the BS 709. For example, RS2 adds its processing time ($DRS_2$) to the idle mode management message received from RS1 and transmits the resulting idle mode management message to its upper RS.

When receiving the idle mode management message successfully, the BS 709 transmits an idle mode management response message, for example, an ACK message for the idle mode management message to RS1 through RS2 and RSN in step 719 and 721.

While not shown, if the received idle mode management message has errors, the BS 709 requests retransmission of the idle mode management message by transmitting a NACK message to its lower RSs 703, 705 and 707.

Upon receipt of the idle mode management response message, RS1 transmits an idle mode transition response message including the RS-determined idle mode management information of step 713 to the MS 701 in step 723.

Upon receipt of the idle mode transition response message, the MS 701 determines whether RS1 has approved the idle mode transition. If RS1 has approved, the MS 701 transitions to the idle mode based on the idle mode management information set in the idle mode transition response message. That is, the MS 701 operates in the idle mode for the initial idle duration from the idle mode transition time in step 725.

Then the MS 701 transitions to listening mode according to the listening duration information and monitors reception of a paging signal from RS1 in step 727.

The BS 709 can get knowledge of the idle mode transition time, the idle duration, the listening duration, and the processing delays ($DRS_1$, $DRS_2$, $DRS_N$) of the RSs 703, 705 and 707 from the RS-determined idle mode management information received from RS1, RS2 and RSN. Therefore, the BS 709 transmits the paging signal to the MS 701, taking into account the processing delays of RS1, RS2 and RSN so that the MS 701 can receive the paging signal through RS1, RS2 and RSN in steps 729, 731 and 733. That is, the BS 709 transmits the paging signal to the idle-mode MS 701 earlier than a listening mode transition time by as much time as the processing delays of RS1, RS2 and RSN ($DRS_1$, $DRS_2$, $DRS_N$).

As described above, a serving RS controls idle-mode transition of an MS that is not in communications in order to save power for the MS in the wireless communication system. The serving RS operates in the manner described in FIG. 8.

Figure 8:
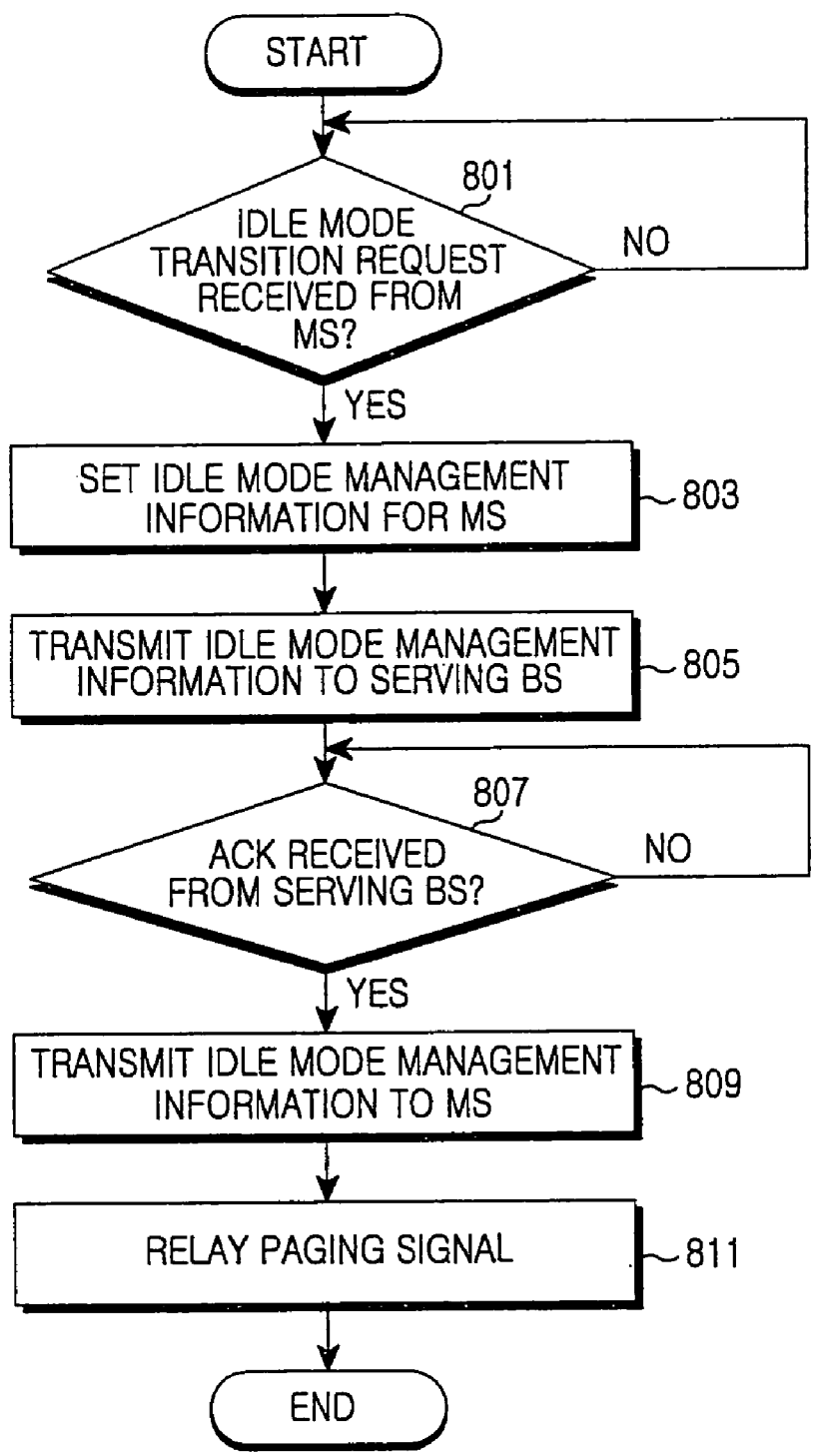
FIG. 8 is a flowchart illustrating an operation of the RS for controlling an idle-mode operation of an MS in the wireless communication system using relaying according to an exemplary embodiment of the present invention.

FIG. 8 is a flowchart illustrating an operation of the RS for controlling an idle-mode operation of an MS in the wireless communication system using relaying according to an exemplary embodiment of the present invention.

Referring to FIG. 8, the RS monitors reception of an idle mode transition request message from an MS within its service area in step 801.

Upon receipt of the idle mode transition request message, the RS sets idle mode management information for the MS in step 803. For example, the RS determines whether to approve the idle mode transition of the MS. If approving the idle mode transition of the MS, the RS checks idle mode management information set by the MS in the idle mode transition request message and determines the idle mode management information based on the MS-determined idle mode management information. The idle mode management information specifies an idle mode transition time, an initial idle duration, a maximum idle duration, a listening duration, and an idle duration extension rate.

Then the RS transmits the RS-determined idle mode management information and its processing delay information to a serving BS, for example, by an idle mode management message in step 805.

In step 807, the RS monitors reception of a response message (i.e., an ACK message for the idle mode management message) from the serving BS. While not shown, upon receipt of a NACK message, the RS retransmits the idle mode management message to the serving BS, considering that the transmitted idle mode management message has errors.

Upon receipt of an ACK message, the RS transmits the RS-determined idle mode management information to the MS, for example, by an idle mode transition response message in step 809.

In step 811, the RS relays a paging signal received from the serving BS to the MS.

Then the RS ends the algorithm.

Figure 9:
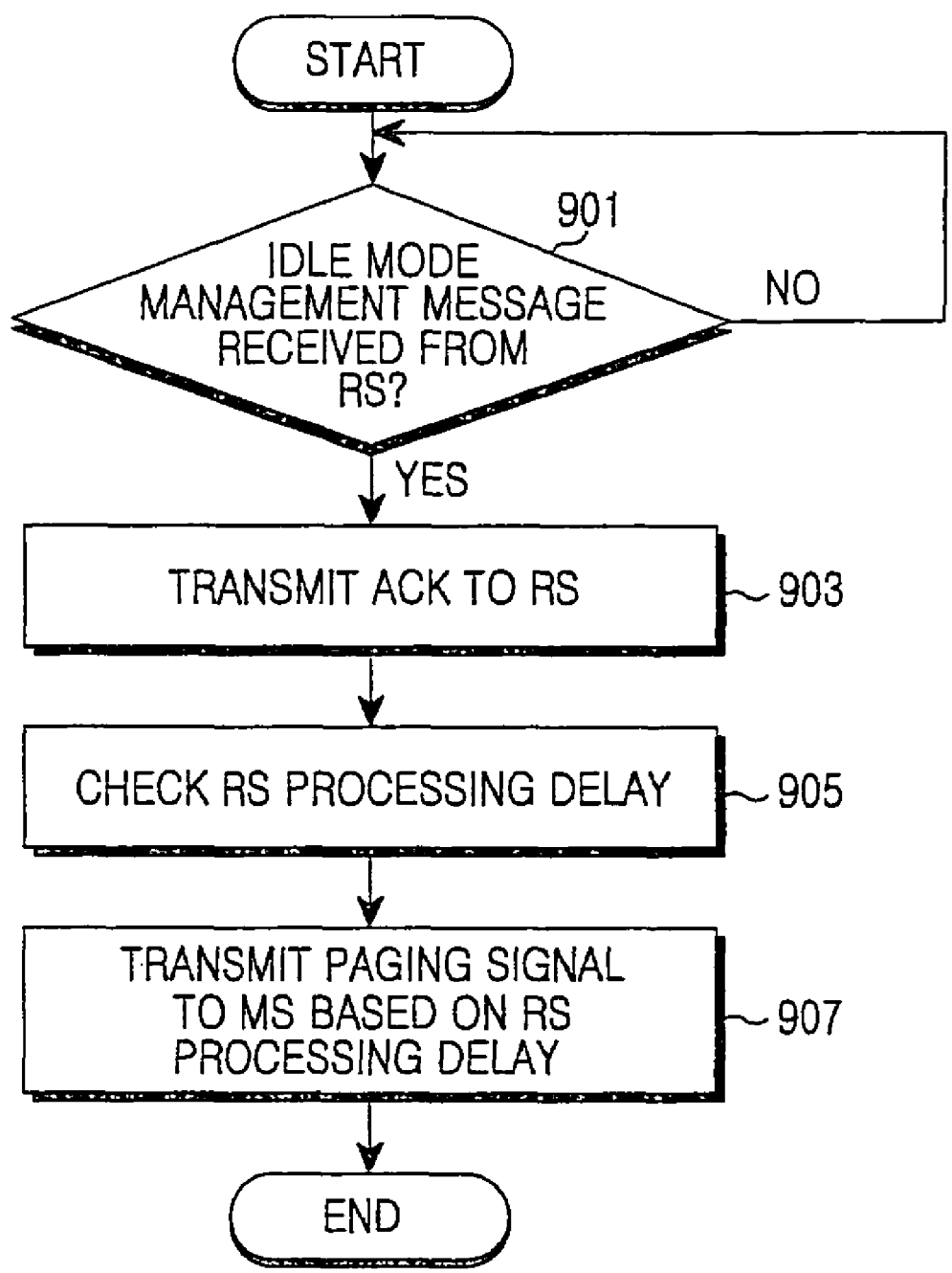
FIG. 9 is a flowchart illustrating an operation of the BS for controlling an idle-mode operation of an MS in the wireless communication system using relaying according to an exemplary embodiment of the present invention.

When the RS controls the sleep mode transition of the MS as described above, the serving BS operates in the manner illustrated in FIG. 9.

FIG. 9 is a flowchart illustrating an operation of the BS for controlling an idle-mode operation of an MS in the wireless communication system using relaying according to an exemplary embodiment of the present invention.

Referring to FIG. 9, the BS monitors reception of an idle mode management message from the RS in step 901.

When receiving the idle mode management message successfully, the BS transmits an ACK message for the idle mode management message to the RS in step 903. While not shown, if the idle mode management message has errors, the BS transmits a NACK message to the RS.

In step 905, the BS checks idle mode management information about an MS that is to transition to idle mode and a processing delay of the RS from the idle mode management message. If the wireless communication system spans three or more hops, the BS checks all processing delays of a plurality of RSs that relay signals to the MS. For example, the idle mode management information includes an idle mode transition time of the MS, an initial idle duration, a maximum idle duration, a listening duration, and an idle duration extension rate.

The BS transmits a paging signal to the RS, taking into account the process delay of the RS so that the idle-mode MS can receive the paging signal during a listening period in step 907. For example, the BS transmits the paging signal earlier than a listening mode transition time of the MS by the processing delay of the RS.

Then the BS ends the algorithm.

The structure of an RS for controlling the idle mode or sleep mode of an MS in the wireless communication system will be described below.

Figure 10:
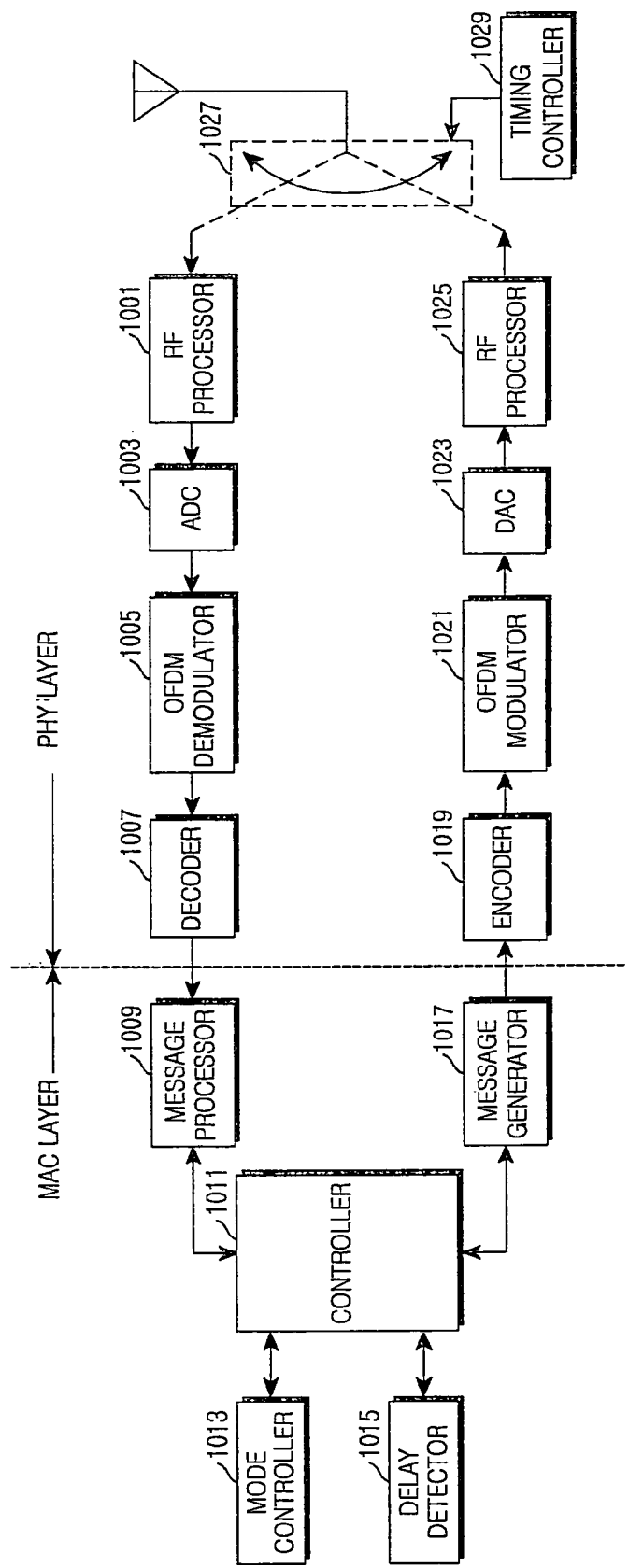
FIG. 10 is a block diagram of the RS in the wireless communication system using relaying according to an exemplary embodiment of the present invention.

FIG. 10 is a block diagram of the RS in the wireless communication system using relaying according to an exemplary embodiment of the present invention.

Referring to FIG. 10, the RS includes a radio frequency (RF) processors 1001 and 1025, an analog-to-digital converter (ADC) 1003, an OFDM demodulator 1005, a decoder 1007, a message processor 1009, a controller 1011, a mode controller 1013, a delay detector 1015, a message generator 1017, an encoder 1019, an OFDM modulator 1021, a digital-to-analog converter (DAC) 1023, a switch 1027, and a timing controller 1029.

The timing controller 1029 controls the switching operation of the switch 1027 based on frame synchronization. For instance, during a reception period, the timing controller 1029 switches the switch 1027 to the RF processor 1001 of a receiver. During a transmission period, the timing controller 1029 switches the switch 1027 to the RF processor 1025 of a transmitter.

During the reception period, the RF processor 1001 downconverts an RF signal received through an antenna to a baseband analog signal. The ADC 1003 converts the analog signal to sample data. The OFDM demodulator 1005 generates the sample data to frequency data by fast Fourier transform (FFT).

The decoder 1007 selects intended subcarrier data from the frequency data and the decoder 1007 demodulates and decodes the selected data at a predetermined modulation level (i.e., modulation and coding scheme (MCS) level).

The message processor 1009 detects control messages from the decoder 1007 and provides them to the controller 1011. For example, the message processor 1009 transmits a sleep mode transition request message received from an MS within the service area of the RS to the controller 1011. The message processor 1009 also transmits an idle mode transition request message received from an MS within the service area of the RS to the controller 1011.

The controller 1011 processes the information received from the message processor 1009 and provides the process result to the mode controller 1013. The controller 1011 controls mode transition of the MS by the mode controller 1013.

Also, upon receipt of an idle mode management message or a sleep mode management message from a lower RS through the message processor 1009, the controller 1011 controls the message generator 1017 to add a process delay time that the delay detector 1015 tells to the idle mode management message or the sleep mode management message.

Upon receipt of the sleep mode transition request message of the MS from the message processor 1009, the mode controller 1013 determines whether to transition the MS to the sleep mode. If approving the sleep mode transition of the MS, the mode controller 1013 determines sleep mode management information for the MS, taking into account MS-determined sleep mode management information included in the sleep mode transition request message.

Upon receipt of the idle mode transition request message of the MS from the message processor 1009, the mode controller 1013 determines whether to transition the MS to the idle mode. If approving the idle mode transition of the MS, the mode controller 1013 determines idle mode management information for the MS, taking into account MS-determined idle mode management information included in the idle mode transition request message.

When the mode controller 1013 approves the idle mode or sleep mode transition of the MS, the controller 1011 controls the message generator 1017 to generate a mode management message in order to transmit the RS-determined mode management information to the BS. Herein, the mode management message can include an idle mode management message or a sleep mode management message.

During the transmission period, the message generator 1017 generates a message with information received from the controller 1011. For example, if the mode controller 1013 approves the idle mode transition of the MS, the message generator 1017 generates an idle mode management message to be transmitted to an upper node under the control of the controller 1011. The idle mode management message includes the RS-determined idle mode management information for the MS and the process delay of the RS.

Also, the message generator 1017 generates an idle mode transition response message to be transmitted to the MS under the control of the controller 1011. The idle mode transition response message includes the RS-determined idle mode management information for the MS.

In another exemplary embodiment of the present invention, if the mode controller 1013 approves the sleep mode transition of the MS, the message generator 1017 generates a sleep mode management message to be transmitted to the upper node under the control of the controller 1011. The sleep mode management message includes the RS-determined sleep mode management information for the MS and the process delay of the RS.

Also, the message generator 1017 generates a sleep mode transition response message to be transmitted to the MS under the control of the controller 1011. The sleep mode transition response message includes the RS-determined sleep mode management information for the MS.

The encoder 1019, which is in a physical layer, encodes and modulates the message or transmission data received from the message generator 1017 according to a predetermined modulation level (e.g., MCS level).

The OFDM modulator 1021 converts the coded data to sample data (OFDM symbol) by inverse fast Fourier transform (IFFT).

The DAC 1023 converts the sample data to an analog signal. The RF processor 1025 upconverts the baseband analog signal received from the DAC 1023 to an RF signal and transmits the RF signal through the antenna.

The controller 1011 acts as a protocol controller and controls the message processor 1009, the mode controller 1013, the delay detector 1015, and the message generator 1017. That is, the controller 1011 can carry out the functions of the message processor 1009, the mode controller 1013, the delay detector 1015, and the message generator 1017. While the message processor 1009, the mode controller 1013, the delay detector 1015, and the message generator 1017 are separately shown in the present invention to thereby separately describe their functions, all or part of them can be incorporated in the controller 1011.

As is apparent from the above description, the present invention advantageously reduces the power consumption of an MS and the load of a BS by allowing an RS to control idle mode and sleep mode of the MS. Also, since the BS has knowledge of the process delay of the RS, the timing of a listening period for the MS can be compensated.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a mode transition of a mobile station (MS) in a relay station (RS) in a wireless communication system, the method comprising:
    determining, at the relay station, upon receipt of a mode transition request signal from at least one mobile station within a service area of the relay station, whether to approve the mode transition request;
    setting a management information for a mode transition of the mobile station, if the mode transition request of the mobile station is approved;
    transmitting the management information to an upper node; and
    upon receipt of an acknowledgment signal for the transmitted management information from the upper node, transmitting the management information to the mobile station.

2. The method of claim 1, wherein the mode transition request signal requests transition to one of an idle mode and a sleep mode.

3. The method of claim 1, wherein the management information setting comprises:
    checking MS-determined management information for the mode transition included in the mode transition request signal, when the mode transition request of the mobile station is approved; and
    setting the management information based on the MS-determined management information.

4. The method of claim 1, wherein the management information includes at least one of a mode transition time, an initial idle duration, a maximum idle duration, a listening duration, an idle duration extension rate, an initial sleep duration, a maximum sleep duration, and a sleep duration extension rate.

5. The method of claim 1, wherein transmitting the management information to the upper node comprises:
    checking a processing delay of the relay station; and
    transmitting the management information and an information about the processing delay of the relay station to the upper node.

6. The method of claim 1, wherein the upper node is one of a serving base station (BS) and an upper relay station.

7. The method of claim 1, further comprising, upon receipt of a signal including management information for a mode transition of a mobile station and information about a processing delay of at least one lower relay station from a lower relay station, adding a processing delay of the relay station to the received signal and transmitting the signal with the processing delay of the relay station to the upper node.

8. The method of claim 7, wherein the upper node is one of a serving base station and an upper relay station.

9. A method for transmitting a signal to a relay station in a base station (BS) in a wireless communication system, the method comprising:
    checking management information for a mode transition of a mobile station and information about a processing delay of at least one lower relay station in a signal received from a relay station, the signal associated with a determination by the lower relay station to approve the mode transition; and
    transmitting to the relay station a signal indicating whether there is data to be transmitted to the mobile station, taking into account the processing delay of the lower relay station.

10. The method of claim 9, wherein the mode is one of an idle mode and a sleep mode.

11. The method of claim 9, wherein the management information includes at least one of a mode transition time, an initial idle duration, a maximum idle duration, a listening duration, an idle duration extension rate, an initial sleep duration, a maximum sleep duration, and a sleep duration extension rate.

12. The method of claim 9, wherein the signal indicating whether there is data to be transmitted to the mobile station includes one of a traffic indication message and a paging signal.

13. The method of claim 9, wherein the signal transmission to the relay station comprises:
    checking a listening mode transition time of the mobile station that performed the mode transition from the management information; and
    transmitting the signal indicating whether there is data to be transmitted to the mobile station earlier than the listening mode transition time by the processing delay of the lower relay station.

14. An apparatus of a relay station (RS) in a wireless communication system, the apparatus comprising:
    a receiver configured to receive a mode transition request signal from at least one mobile station within a service area of the relay station;
    a controller configured to determine whether to approve the mode transition request, upon receipt of the mode transition request signal, and set a management information for the mode transition of the mobile station, if the mode transition request of the mobile station is approved; and
    a transmitter configured to transmit the management information to an upper node and transmit the management information to the mobile station upon receipt of an acknowledgment signal for the transmitted management information from the upper node.

15. The apparatus of claim 14, wherein the mode transition request signal requests transition to one of an idle mode and a sleep mode.

16. The apparatus of claim 14, wherein the controller checks MS-determined management information for the mode transition included in the mode transition request signal, and sets the management information based on the MS-determined management information.

17. The apparatus of claim 14, wherein the management information includes at least one of a mode transition time, an initial idle duration, a maximum idle duration, a listening duration, an idle duration extension rate, an initial sleep duration, a maximum sleep duration, and a sleep duration extension rate.

18. The apparatus of claim 14, further comprising a delay detector for checking a processing delay of the relay station, wherein the transmitter transmits the management information and the information about the processing delay to an upper node, when the controller approves the mode transition request of the mobile station.

19. The apparatus of claim 14, wherein the upper node is one of a serving base station (BS) and an upper relay station.

20. The apparatus of claim 14, further comprising a delay detector for checking a processing delay of the relay station, wherein upon receipt of a signal including the management information for a mode transition of a mobile station and the information about a processing delay of at least one lower relay station from a lower relay station through the receiver, the transmitter adds the processing delay of the relay station checked by the delay detector to the received signal and transmits the signal with the processing delay of the relay station to the upper node.

21. The apparatus of claim 20, wherein the upper node is one of a serving base station and an upper relay station.

* * * * *